US008668238B2

(12) United States Patent
Kuwano et al.

(10) Patent No.: US 8,668,238 B2
(45) Date of Patent: Mar. 11, 2014

(54) GLOVE BOX STRUCTURE FOR VEHICLE

(75) Inventors: Yohei Kuwano, Wako (JP); Masamitsu Shiono, Wako (JP); Katsuhiko Sato, Wako (JP); Tsukasa Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 68 days.

(21) Appl. No.: 13/288,962

(22) Filed: Nov. 4, 2011

(65) Prior Publication Data

US 2012/0126563 A1    May 24, 2012

(30) Foreign Application Priority Data

Nov. 22, 2010  (JP) ................................. 2010-260475

(51) Int. Cl.
*B60R 7/06* (2006.01)
(52) U.S. Cl.
USPC .................... 296/37.12; 296/187.05; 224/483
(58) Field of Classification Search
USPC ............................ 296/187.05, 37.12; 224/483
See application file for complete search history.

(56) References Cited

U.S. PATENT DOCUMENTS

| | | | | |
|---|---|---|---|---|
| 5,971,461 A * | 10/1999 | Vaishnav et al. | ............ | 296/37.12 |
| 6,299,208 B1 * | 10/2001 | Kasahara et al. | ............. | 280/752 |
| 6,786,524 B2 * | 9/2004 | Tamura | ....................... | 296/37.12 |
| 7,201,434 B1 * | 4/2007 | Michalak et al. | ........ | 296/187.05 |
| 7,735,865 B2 * | 6/2010 | Cappabianca et al. | ........ | 280/752 |
| 8,251,399 B2 * | 8/2012 | Babian | ........................... | 280/752 |
| 2003/0207077 A1 * | 11/2003 | Riha et al. | ...................... | 428/120 |
| 2007/0205624 A1 * | 9/2007 | Zellner et al. | .............. | 296/37.12 |
| 2008/0106110 A1 * | 5/2008 | Miki et al. | .................. | 296/37.12 |
| 2009/0165392 A1 * | 7/2009 | Totani et al. | .................... | 49/502 |
| 2010/0084884 A1 * | 4/2010 | Taracko | ..................... | 296/37.12 |

FOREIGN PATENT DOCUMENTS

JP    08-119040    5/1996
JP    08192465 A *  7/1996

* cited by examiner

*Primary Examiner* — Jason S Morrow
*Assistant Examiner* — E Turner Hicks
(74) *Attorney, Agent, or Firm* — Ditthavong Mori & Steiner, P.C.

(57) ABSTRACT

A glove box structure for a vehicle includes a storage portion and a lid portion. The lid portion is openably mounted on a instrument panel of the vehicle and includes an inner panel, honeycomb structure ribs, an intermediate panel, and an outer panel. The inner panel is disposed on a storage portion side. The honeycomb structure ribs integrally formed with the inner panel. Each of the honeycomb structure ribs is disposed on a first surface of the inner panel. The first surface is disposed on an opposite side of the inner panel to the storage portion. The intermediate panel is attached to at least one of the honeycomb structure ribs to increase a shock transfer capability of the inner panel. The outer panel is mounted on the inner panel. The intermediate panel is sandwiched between the outer panel and the honeycomb structure ribs.

17 Claims, 15 Drawing Sheets

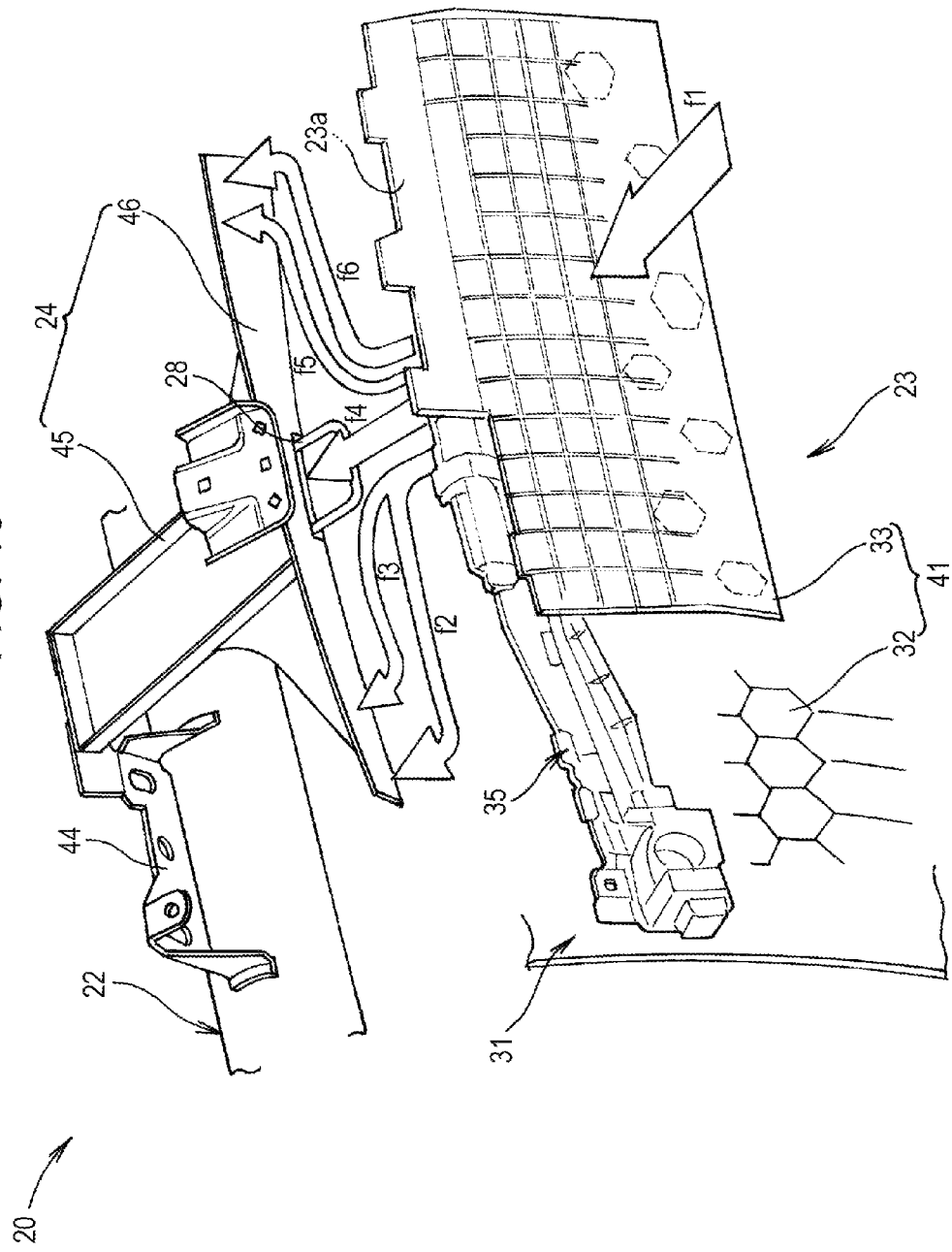

GLOVE BOX STRUCTURE FOR VEHICLE

CROSS-REFERENCE TO RELATED APPLICATIONS

The present application claims priority under 35 U.S.C. §119 to Japanese Patent Application No. 2010-260475, filed Nov. 22, 2010, entitled "Glove Box Structure for Vehicle". The contents of this application are incorporated herein by reference in their entirety.

BACKGROUND OF THE INVENTION

1. Field of the Invention

The present invention relates to a glove box structure for a vehicle.

2. Discussion of the Background

In the glove box structure for a vehicle, a glove box includes a box body (a storage portion) that stores items, an inner panel formed of resin integrally with the box body, and an outer panel formed of resin mounted outside the inner panel. The glove box is openably mounted on an opening portion of the instrument panel.

The inner panel has reinforcing ribs integrally formed therewith. The reinforcing ribs, which protrude toward the outer panel side, reinforce the inner panel and the outer panel.

With this glove box structure for a vehicle, costs can be decreased, and manufacturability can be improved (see, for example, Japanese Unexamined Patent Application

SUMMARY OF THE INVENTION

According to one aspect of the present invention, a glove box structure for a vehicle comprises a storage portion and a lid portion. The storage portion is disposed below an instrument panel of the vehicle and is configured to store items. The lid portion is openably mounted on the instrument panel and is attached to the storage portion. The lid portion comprises an inner panel, honeycomb structure ribs, an intermediate panel, and an outer panel. The inner panel is disposed on a storage portion side. The honeycomb structure ribs integrally formed with the inner panel. Each of the honeycomb structure ribs is disposed on a first surface of the inner panel. The first surface is disposed on an opposite side of the inner panel to the storage portion. The intermediate panel is attached to at least one of the honeycomb structure ribs to increase a shock transfer capability of the inner panel. The outer panel is mounted on the inner panel. The intermediate panel is sandwiched between the outer panel and the honeycomb structure ribs.

According to another aspect of the present invention, a glove box structure for a vehicle comprises a storage portion, a lid portion, and a shock transfer member. The storage portion is disposed below an instrument panel of the vehicle and is configured to store items. The lid portion is openably mounted on the instrument panel and is attached to the storage portion. The shock transfer member extends from a vehicle body structure of the vehicle. The shock transfer member is configured to support an upper end of the lid portion in a longitudinal direction of the vehicle. The shock transfer member has a substantially T-like shape when viewed from a vertical direction of the vehicle. The shock transfer member comprises a first portion and a second portion. The first portion corresponds to a vertical portion of the substantially T-like shape and has an end portion supported by the vehicle body structure. The second portion corresponds to a horizontal portion of the substantially T-like shape and is configured to support the upper end of the lid portion in the longitudinal direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 16 is an operational explanatory view illustrating flows of a load in a shock transfer member of the glove box structure for a vehicle illustrated in FIG. 2.

DESCRIPTION OF THE EMBODIMENTS

Figure 1:
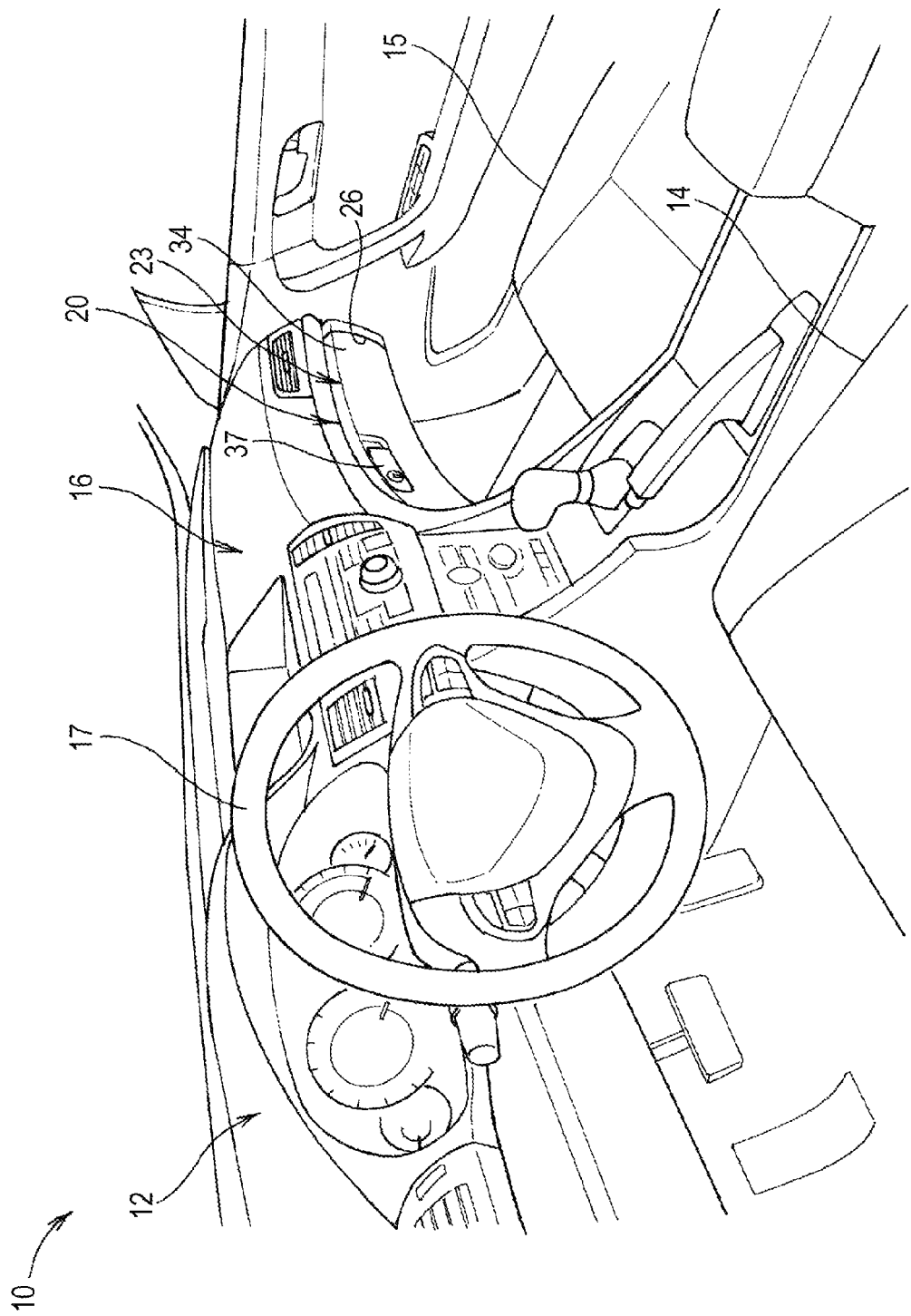
FIG. 1 is a perspective view illustrating a vehicle that uses a glove box structure for a vehicle according to an embodiment of the present invention.
Figure 2:
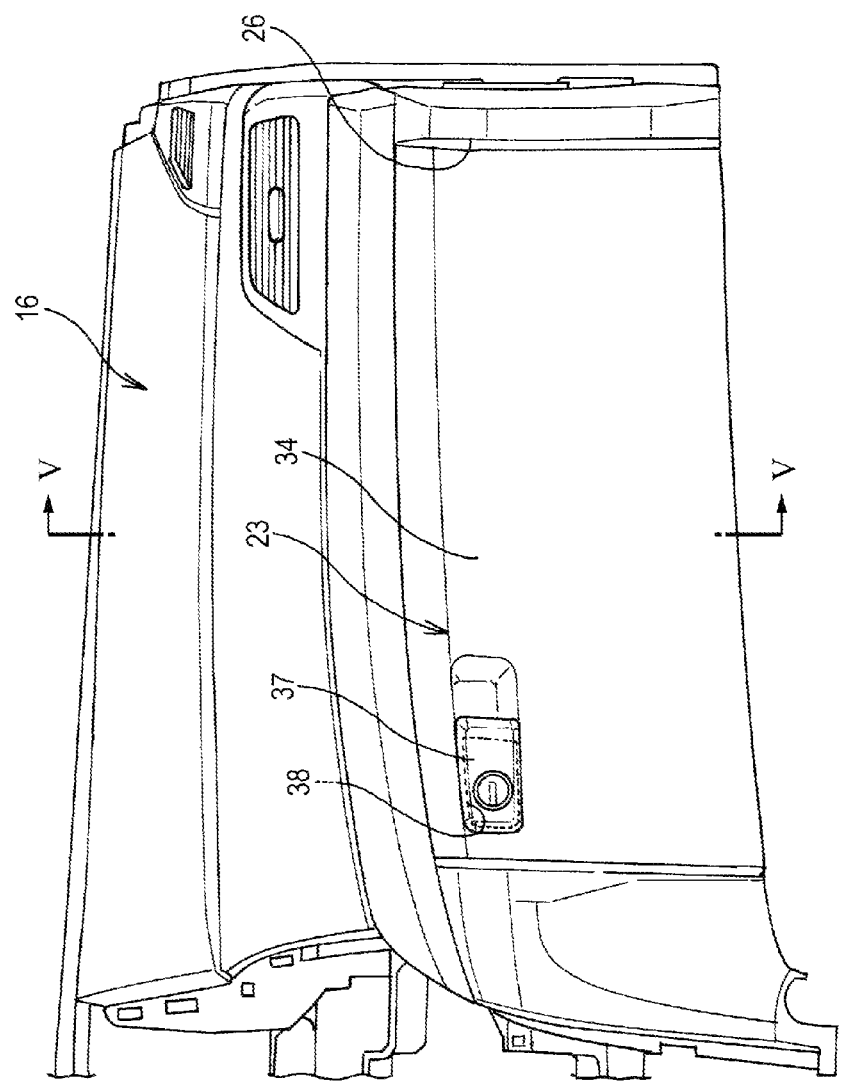
FIG. 2 is a front view of the glove box structure for a vehicle according to an embodiment of the present invention.
Figure 3:
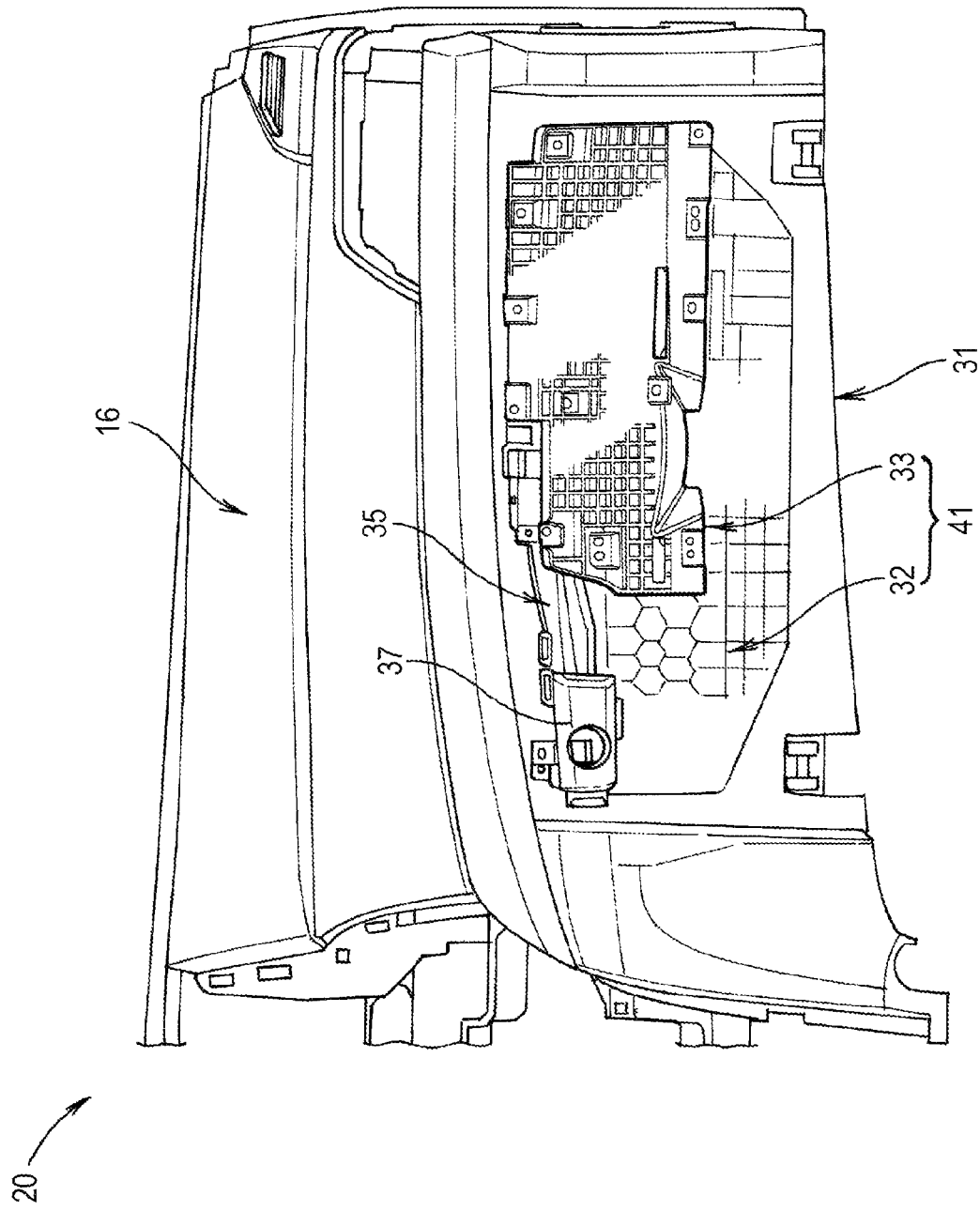
FIG. 3 is a front view of the glove box structure for a vehicle illustrated in FIG. 2 with an outer panel removed.
Figure 4:
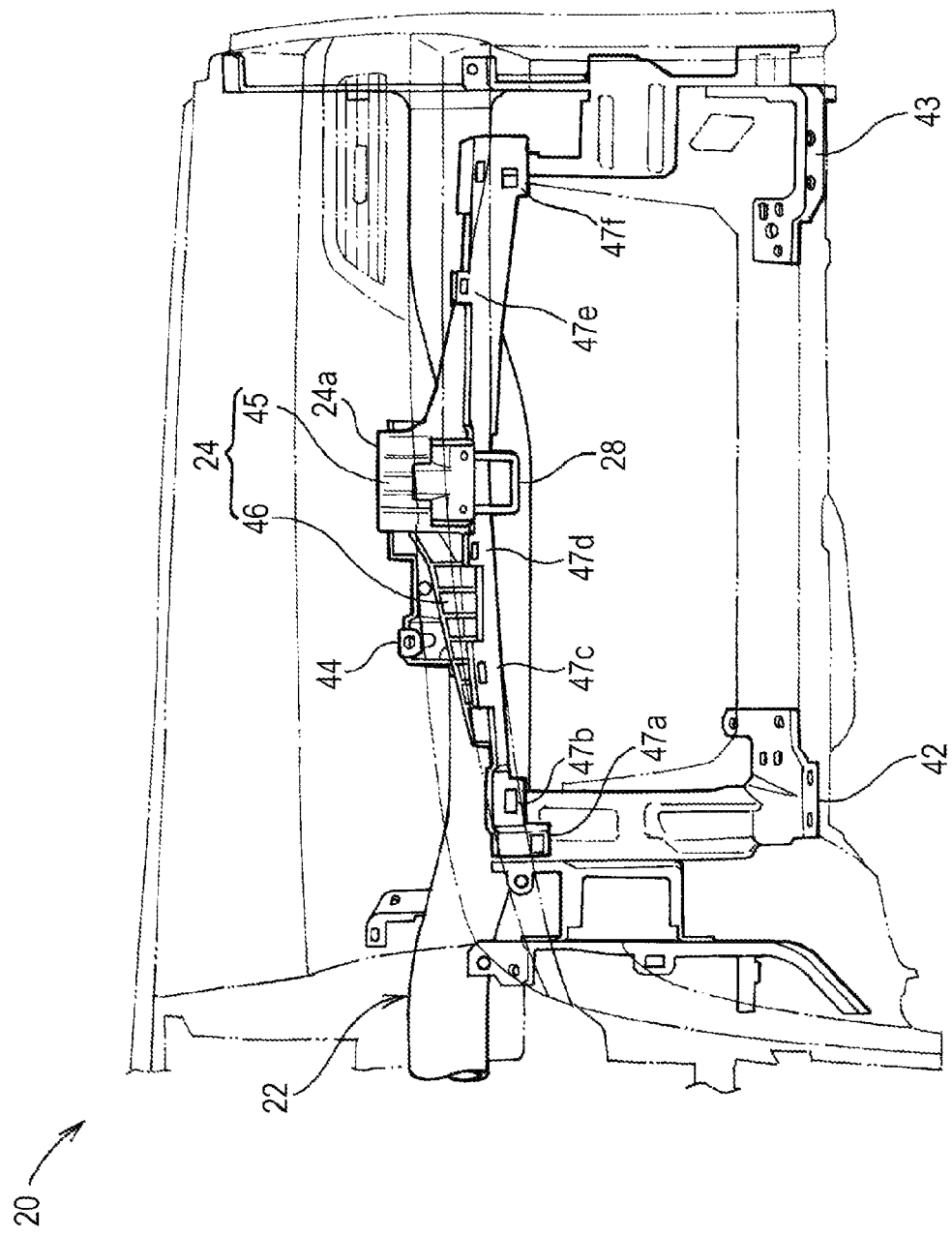
FIG. 4 is a front view illustrating the inner structure of the glove box structure for a vehicle illustrated in FIG. 2.

The embodiments will now be described with reference to the accompanying drawings, wherein like reference numerals designate corresponding or identical elements throughout the various drawings. The drawings are to be seen in a direction in which reference numerals are oriented.

As illustrated in FIG. 1, a vehicle 10 includes a driver seat 14, a passenger seat 15, an instrument panel 16, a steering wheel 17, and a glove box (glove box for a vehicle) 20 arranged in a vehicle cabin 12. A driver sits on the driver seat 14, and an occupant sits on the passenger seat 15. The instrument panel 16 is disposed in front of the driver seat 14 and the passenger seat 15, the steering wheel 17 is disposed in front of the driver seat 14, and the glove box 20 that contains items is disposed in front of the passenger seat 15. The vehicle 10 is a left-hand drive vehicle in which the steering wheel 17 is arranged on the left side of the vehicle 10.

As illustrated in FIGS. 2 to 6, a glove box structure for a vehicle includes a storage portion 21, a lid portion 23, and a shock transfer member 24. The storage portion 21 that stores items is disposed below the instrument panel 16. The lid portion 23 is openably mounted on the instrument panel 16 so as to cover the storage portion 21. The shock transfer member 24 extends from a vehicle body structure 22 so as to receive an upper end 23a of the lid portion 23 in a longitudinal direction of a vehicle body. In the glove box structure for a vehicle, a load input from the knees of the occupant to the lid portion 23 of the glove box 20 is absorbed using left and right absorbers 48 and 49, and transferred from the upper end 23a of the lid portion 23 to the vehicle body structure 22 using the shock transfer member 24.

The instrument panel 16 has an opening portion 26 that faces the lid portion 23. In addition, a striker 28, which is engaged with a lock mechanism 35, is disposed on the instrument panel 16 side.

The lid portion 23 includes an inner panel 31, honeycomb structure ribs 32, an intermediate panel 33, an outer panel 34, the lock mechanism 35, and left and right shaft portions 36 (one of the shaft portions 36 is not shown). The inner panel 31 is formed of resin and disposed on the storage portion 21 side. The resin honeycomb structure ribs 32 are integrally formed with the inner panel 31 on a front surface 31a side. The intermediate panel 33 is attached to the honeycomb structure ribs 32 so as to increase a shock transfer capability of the resin inner panel 31 that transfers shock. The outer panel 34 is formed of resin and mounted on the inner panel 31 such that the intermediate panel 33 is sandwiched between the outer panel 34 and the honeycomb structure ribs 32. The lock mechanism 35 is disposed in the inner panel 31 so as to be locked with the instrument panel 16. The shaft portions 36 are disposed at the outer panel 34 so as to be fitted into support portions 27 (one of the support portions 27 is not shown) of the instrument panel 16.

The outer panel 34 has a knob opening 38 through which a lock knob 37 of the lock mechanism 35 protrudes. A knee bolster (load transfer portion) 41 that transfers shock includes the honeycomb structure ribs 32 and the intermediate panel (lid member) 33.

Figure 7:
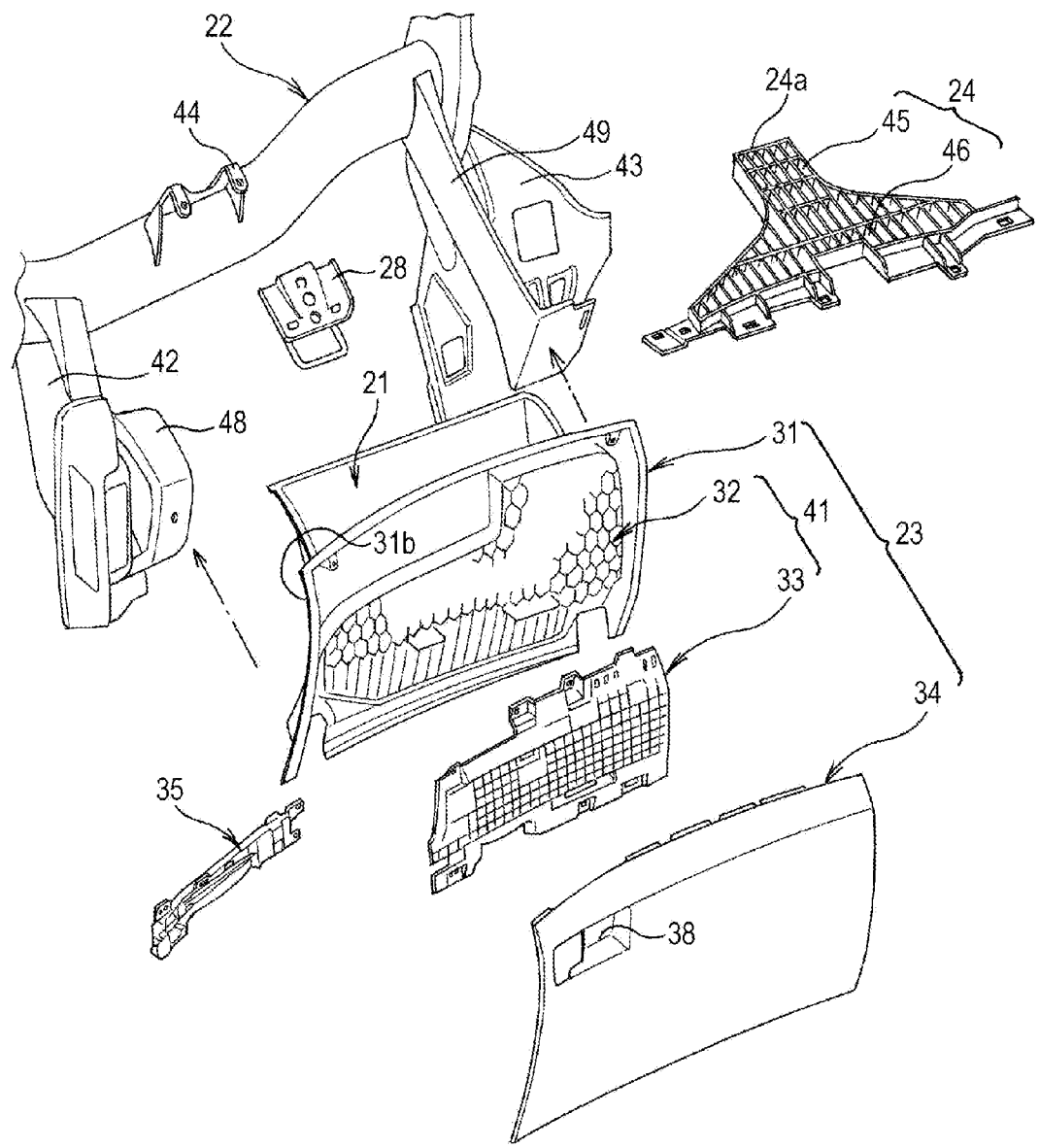
FIG. 7 is an exploded perspective view of the glove box structure for a vehicle illustrated in FIG. 2.
Figure 8:
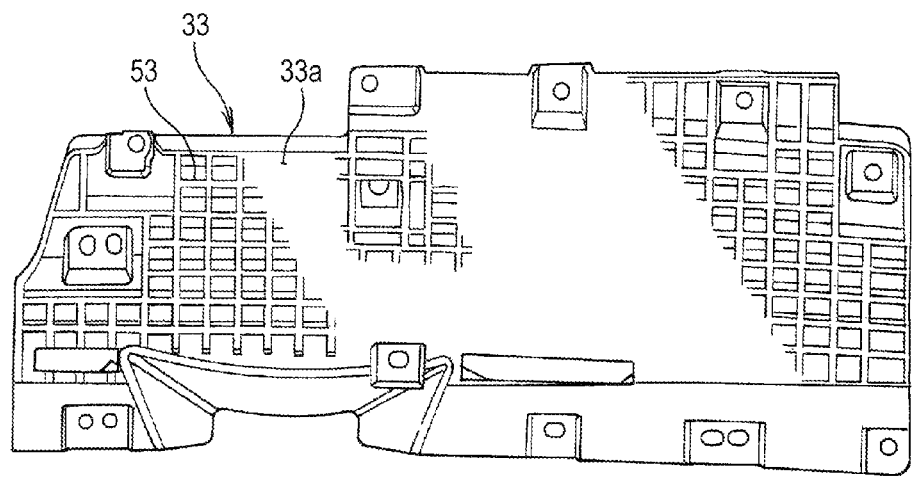
FIG. 8 is a front view of an intermediate panel of the glove box structure for a vehicle illustrated in FIG. 2.
Figure 9:
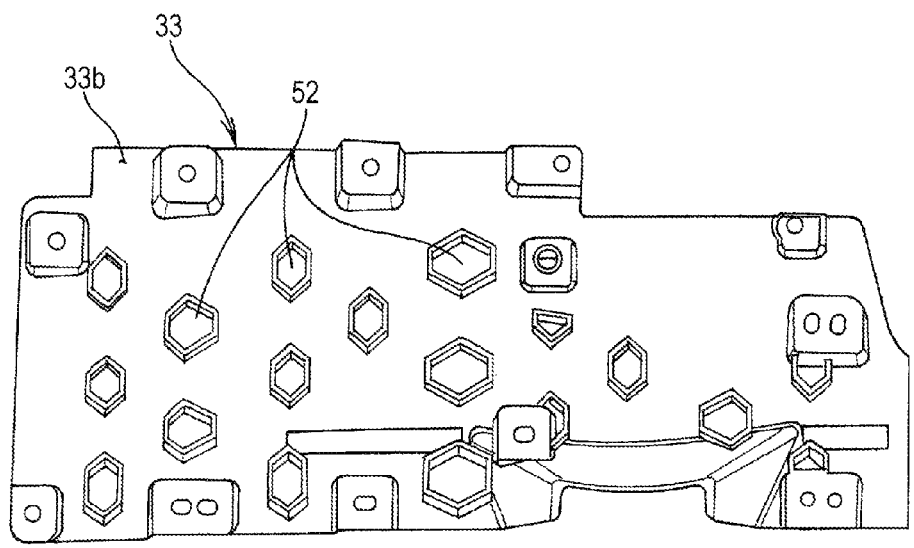
FIG. 9 is a rear view of the intermediate panel of the glove box structure for a vehicle illustrated in FIG. 2.

The vehicle body structure 22 is a steering hanger that extends in a width direction of the vehicle and supports the steering wheel 17 (see FIG. 1). The vehicle body structure 22 includes left and right stay members 42 and 43, a bracket 44, and the left and right absorbers 48 and 49 (see FIG. 7). The left and right stay members 42 and 43 support the inner panel 31. The bracket 44 supports the shock transfer member 24. The left and right absorbers 48 and 49 absorb a load input to the storage portion 21 and the lid portion 23. Specifically, as illustrated in FIG. 7, the left and right absorbers 48 and 49 receive (support) a rear surface 31b of the inner panel 31.

The shock transfer member 24 has a substantially T-like shape in plan view. Specifically, the shock transfer member 24 has a vertical portion 45 and a horizontal portion 46. The vertical portion 45, which corresponds to the vertical portion of the substantially T-like shape, has an end portion 24a that is supported by the vehicle body structure 22 (steering hanger). The horizontal portion 46, which corresponds to the horizontal portion of the substantially T-like shape, receives the upper end 23a of the lid portion 23 in the longitudinal direction of the vehicle. The horizontal portion 46 has support pieces 47a to 47f that are supported by the instrument panel 16 side.

The horizontal portion 46 supports (receives) the upper end 23a of the lid portion 23 when the lid portion 23 is closed. The shock transfer member 24 is upwardly inclined toward the front side of the vehicle body so as to extend along a load transfer direction in which a load is transferred when the knees of the occupant contact the lid portion 23.

The storage portion 21 is integrally formed with the inner panel 31 on the rear surface 31b of the inner panel 31. The storage portion 21 is a projectable storage portion that is projectable from a position below the instrument panel 16 together with the inner panel 31 (kangaroo pouch-like storage portion). The storage portion 21 may be formed separately from the inner panel 31 and mounted to the inner panel 31.

The honeycomb structure ribs 32 form substantially hexagonal shapes. The substantially hexagonal shapes are deformed and include a plurality of shapes. The plurality of shapes may be pentagonal and rectangular shapes.

Rectangular ribs 53 are formed on a front surface 33a (on the outer panel 34 side) of the intermediate panel 33. Substantially hexagonal intermediate panel cells 52 are formed on a rear surface 33b (on the storage portion 21 side) of the intermediate panel 33. The number of the intermediate panel cells 52 is smaller than that of inner panel cells 51 that are formed in the honeycomb structure.

The substantially hexagonal intermediate panel cells 52 are fitted into some of the inner panel cells 51 (with some of the inner panel cells 51 skipped).

Figure 10:
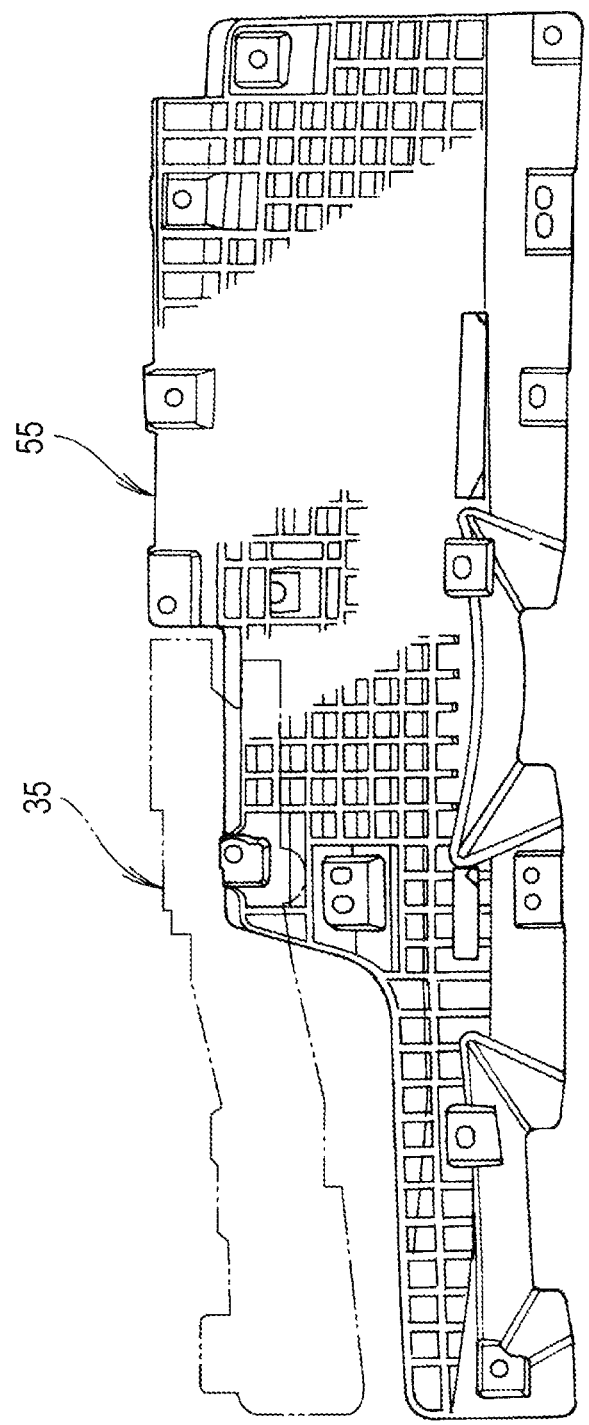
FIG. 10 is a front view of an intermediate panel of the glove box structure for a vehicle illustrated in FIG. 2 according to an alternative embodiment.

FIG. 10 illustrates an intermediate panel 55 according to an alternative embodiment. In the intermediate panel 55, a shock transfer portion of the intermediate panel 55 extends to an area below the lock mechanism 35. The intermediate panel 33 or the intermediate panel 55 of the alternative embodiment may be selected depending on the type of a vehicle. The intermediate panel 55 is a panel (a lid member) that has a structure substantially similar to the structure of the intermediate panel 33.

Figure 11A:
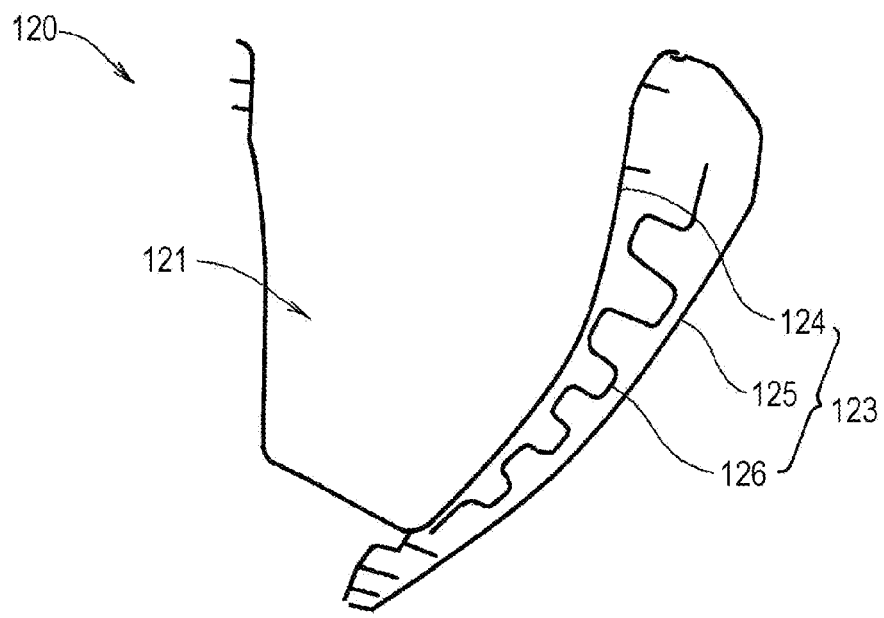
FIGS. 11A and 11B illustrate glove box structures for a vehicle according to an embodiment of the present invention for comparison.

FIG. 11A illustrates a glove box structure for a vehicle of a comparative example. In the glove box structure for a vehicle of the comparative example, a glove box 120 includes a storage portion 121, an inner panel 124, an outer panel 125, and a corrugated panel (knee bolster) 126. The storage portion 121 is formed of resin and stores items. The resin inner panel 124 is integrally formed with the storage portion 121. The outer panel 125 is formed of resin and covers the inner panel 124. The corrugated panel 126 is formed of steel and arranged between the inner panel 124 and the outer panel 125. The steel corrugated panel 126 increases a shock transfer capability of the inner panel 124 and the outer panel 125.

A lid portion 123 includes the inner panel 124, the outer panel 125, and the corrugated panel (knee bolster) 126.

A corrugated steel plate is used for the corrugated panel 126 in the glove box structure for a vehicle of the comparative example. With a considerable weight of the corrugated steel plate, it is impossible to decrease the weight of the vehicle.

Figure 11B:
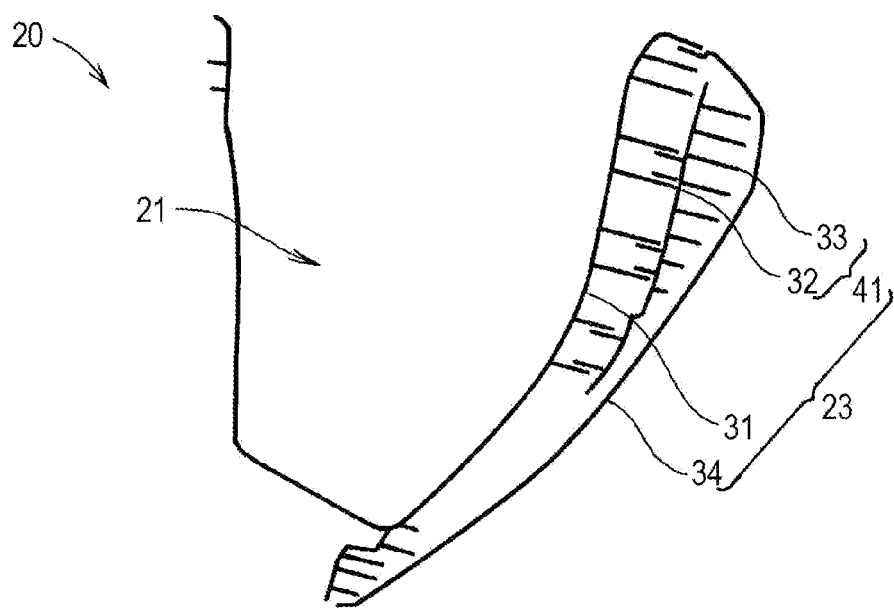

FIG. 11B illustrates a glove box structure for a vehicle according to the embodiment. In this glove box structure for a vehicle, the honeycomb structure ribs 32, which are integrally formed with the inner panel 31 on the front surface 31a side of the inner panel 31, and the intermediate panel 33, which is attached to the honeycomb structure ribs 32 so as to transfer shock, are disposed between the inner panel 31 and the outer panel 34 in the lid portion 23. This allows the lid portion 23 to have a sufficient shock transfer capability even without using, for example, the corrugated panel 126 (load transfer portion) that is formed of steel and transfers shock from the knees of the occupant. As a result, the weight of the vehicle body can be decreased compared to the case in which the steel corrugated panel 126 (load transfer portion) is used.

Figure 12A:
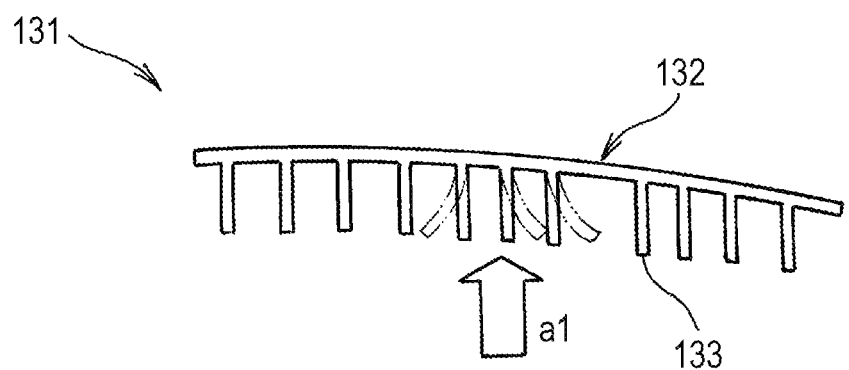
FIGS. 12A to 12C illustrate knee bolsters (shock-absorbing portions) of the glove box structure for a vehicle illustrated in FIG. 2 for comparison.

FIG. 12A illustrates a knee bolster (load transfer portion) 131 of another comparative example. The knee bolster 131 includes honeycomb structure ribs 133 formed on an inner panel 132, which are only the honeycomb structure ribs of the knee bolster 131. When a concentrated load as indicated by an arrow a1 is applied to part of the honeycomb structure ribs 133, some of the honeycomb structure ribs 133 bend or buckle. Thus, the load cannot be distributed over a larger area.

Figure 12B:
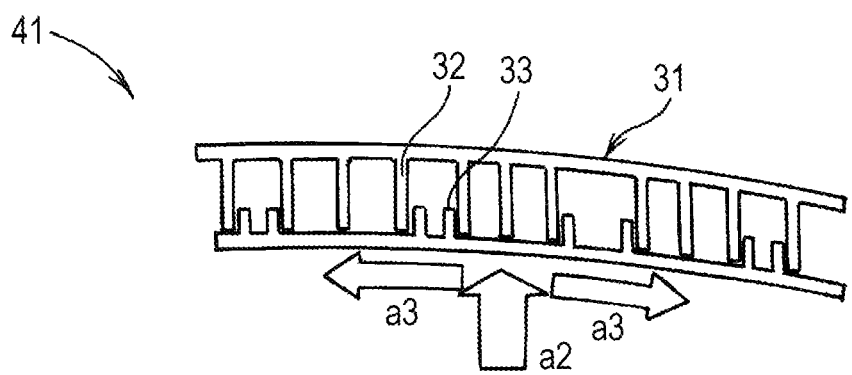
Figure 12C:
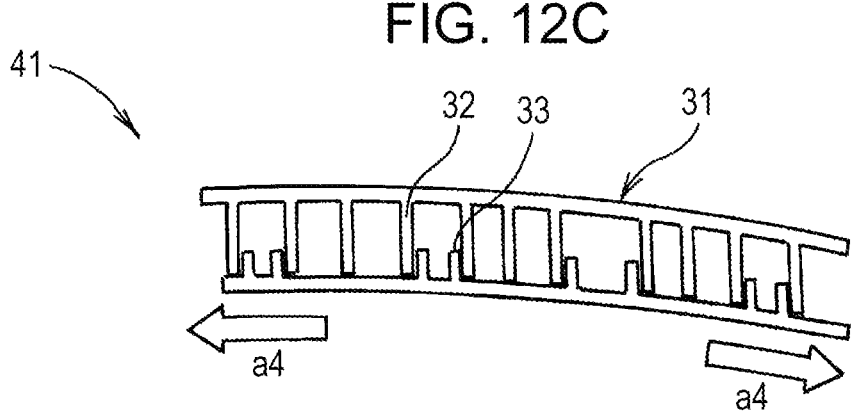

FIGS. 12B and 12C illustrate the knee bolster (load transfer portion) 41 according to the embodiment. The knee bolster 41 includes the honeycomb structure ribs 32 integrally formed with the inner panel 31 and the intermediate panel (lid member) 33 that is attached to the honeycomb structure ribs 32. This can prevent a situation in which some of the honeycomb structure ribs 32 bend or buckle from occurring.

As illustrated in FIG. 12B, a concentrated load applied to part of the honeycomb structure ribs 32 as indicated by an arrow a2 can be distributed as indicated by arrows a3. As illustrated in FIG. 12C, the load is distributed to a wide area as indicated by arrows a4 and transferred to the honeycomb structure ribs 32.

In the knee bolster (load transfer portion) 41, the substantially hexagonal intermediate panel cells 52, the number of which is smaller than that of the inner panel cells 51 formed in the honeycomb structure, are formed on the intermediate panel (lid member) 33. The substantially hexagonal intermediate panel cells 52 are fitted into some of the inner panel cells 51. This can increase distribution of a transferred load.

Figure 13A:
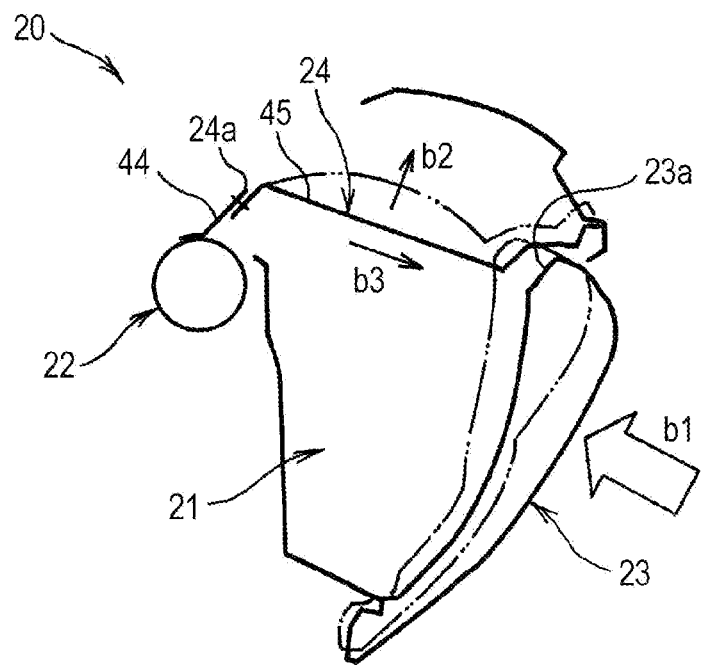
FIGS. 13A and 13B are explanatory views illustrating deformation of the glove box structure for a vehicle illustrated in FIG. 2.

FIG. 13A illustrates the structure of the glove box structure for a vehicle seen from a side. When an input (a load) is applied from the knees of the occupant to the lid portion 23 as indicated by an arrow b1, the lid portion 23 moves toward the front side of the vehicle body. Since the upper end 23a of the lid portion 23 is supported using the shock transfer member 24 in the longitudinal direction of the vehicle, the load is transferred from the upper end 23a of the lid portion 23 to the vertical portion 45 of the shock transfer member 24. This causes the vertical portion 45 to be subject to bending deformation as indicated by an arrow b2. The vertical portion 45 having undergone bending deformation as indicated by the arrow b2 tends to return to the state that existed before the vertical portion underwent bending deformation. This can result a reaction force as indicated by an arrow b3 applied to the upper end 23a of the lid portion 23. As a result, the support stiffness of the lid portion 23 can be increased.

Figure 13B:
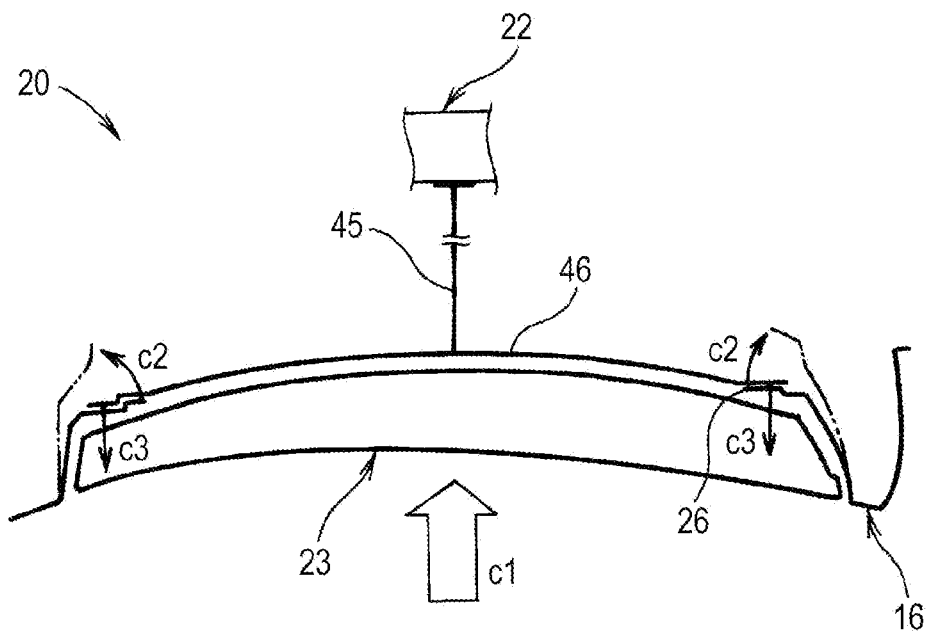

FIG. 13B illustrates a plan view of the glove box structure for a vehicle. When an input (load) is applied from the knees of the occupant to the lid portion 23 as indicated by an arrow c1, forces in opening directions as indicated by arrows c2 are applied to the opening portion 26 of the instrument panel 16. When the forces in the opening directions as indicated by the arrows c2 are applied to the opening portion 26, reaction forces as indicated by arrows c3 are generated at the horizontal portion 46 of the shock transfer member 24. The horizontal portion 46 supports, when the lid portion 23 is closed, the upper end 23a of the lid portion 23 in the vehicle width direction of the opening portion 26 over a length, thereby preventing the opening portion 26 from opening.

Figure 14:
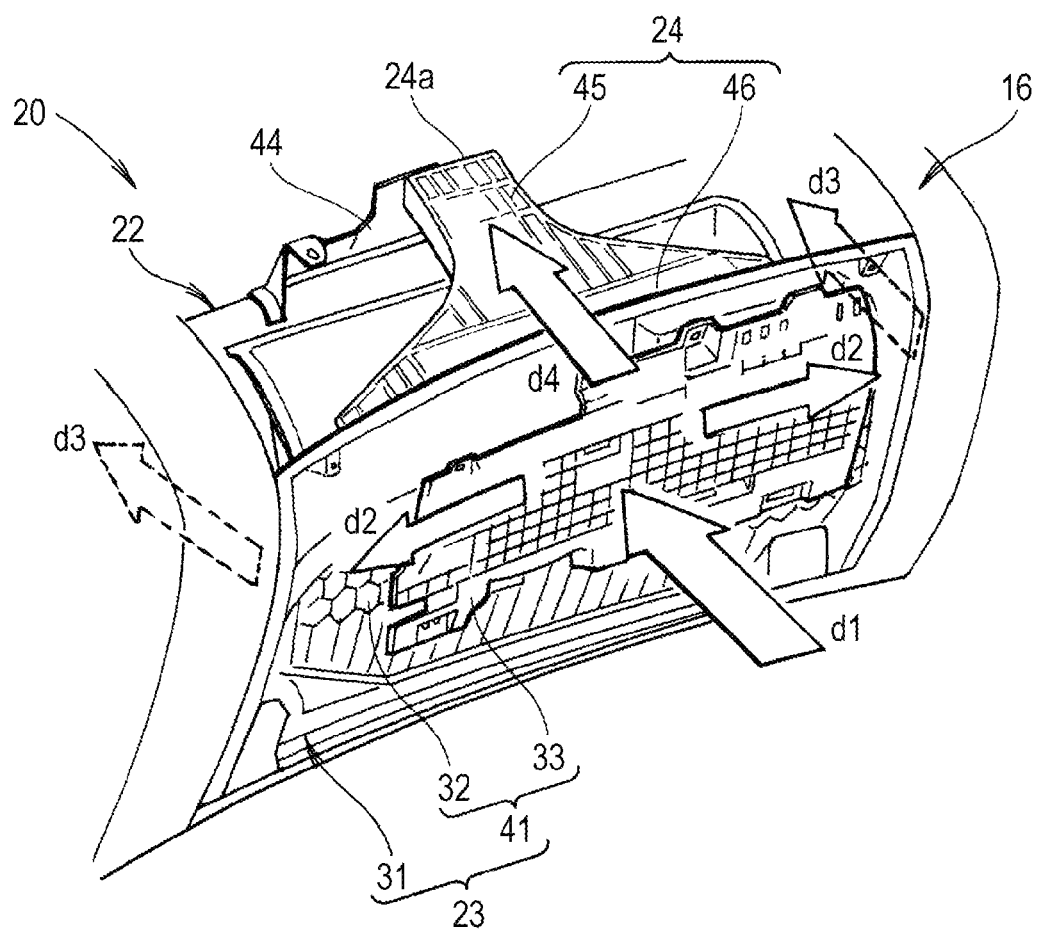
FIG. 14 is an explanatory view illustrating a load path concept of the glove box structure for a vehicle illustrated in FIG. 2.

FIG. 14 illustrates the glove box structure for a vehicle according to the embodiment. In the glove box structure for a vehicle, a load from the knees of the occupant applied as indicated by an arrow d1 is distributed in the vehicle width directions as indicated by arrows d2 using the outer panel 34 (see FIG. 2), the intermediate panel 33, the honeycomb structure ribs 32, and the inner panel 31, and transferred to the vehicle body structure 22 as indicated by arrows d3 using the left and right stay members 42 and 43 (see FIG. 4) (load path). The shock is absorbed by the left and right absorbers 48 and 49 (see FIG. 7). Furthermore, the load from the knees that is applied as indicated by the arrow d1 is transferred to the vehicle body structure 22 as indicated by arrow d4 using the shock transfer member 24.

That is, by covering the honeycomb structure ribs 32 with the intermediate panel 33 (sandwiching the intermediate panel 33 between the honeycomb structure ribs 32 and the outer panel 34), flows of the load indicated by the arrows d2 are smoothly transferred. By doing this, flows of the load indicated by arrows d3 transferred through the left and right stay members 42 and 43 (see FIG. 4) to the vehicle body structure 22 can be increased.

In addition, since the shock transfer member 24 is provided, a transferring flow from the upper end 23a of the lid portion 23 to the vehicle body structure 22 as indicated by the arrow d4 can also be increased. The storage portion 21 is integrally formed with the inner panel 31 on the rear surface 31b of the inner panel 31 (see FIG. 5) and is a projectable storage portion that is projectable from a position below the instrument panel 16 together with the inner panel 31 (kangaroo pouch-like storage portion). In particular with this structure, strength and stiffness of the storage portion 21 is low because of an opening at an upper portion. Thus, by extending the shock transfer member 24, which receives the upper end 23a of the lid portion 23 in the longitudinal direction of the vehicle, from the vehicle body structure 22, a new load transfer path can be provided, and strength and stiffness of the glove box structure for a vehicle can be increased.

Figure 15:
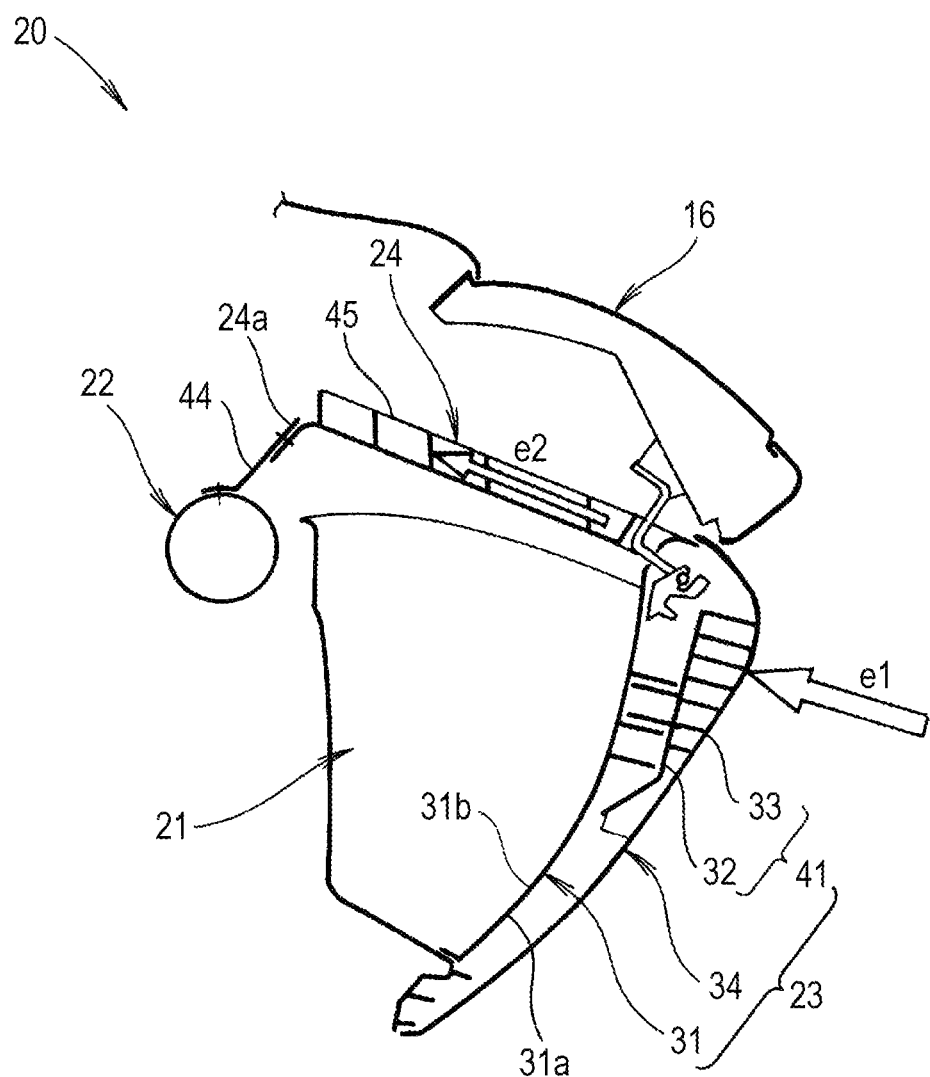
FIG. 15 is an operational explanatory view illustrating a mounting direction of a shock transfer member of the glove box structure for a vehicle illustrated in FIG. 2.

As illustrated in FIG. 15, when a load is applied from the knees of the occupant as indicated by an arrow e1, the load is transferred to the shock transfer member 24 as indicated by an arrow e2. That is, the shock transfer member 24 is upwardly inclined toward the front side of the vehicle body so as to extend along a load transfer direction in which a load is transferred when the knees of the occupant contact the lid portion 23. By doing this, bending of the shock transfer member 24 can be prevented, and accordingly, efficiency of transferring a load from the knees of the occupant can be increased.

As illustrated in FIG. 16, the shock transfer member 24 has a substantially T-like shape in plan view. The shock transfer member 24 has the vertical portion 45, which corresponds to the vertical portion of the substantially T-like shape, and the horizontal portion 46, which corresponds to the horizontal portion of the substantially T-like shape. Thus, a load applied from the knees as indicated by an arrow f1 can be received by the entirety of the horizontal portion 46 as indicated by arrows f2 to f6. By doing this, a situation in which the upper end 23a of the lid portion 23 is partly deformed can be avoided.

Furthermore, in the glove box structure for a vehicle, the horizontal portion 46 of the shock transfer member 24 uses the striker 28 so as to connect, when the striker 28 is locked with the lock mechanism 35, the shock transfer member 24 to the lock mechanism 35 through the striker 28. Thus, efficiency of transferring a load from the knees to the shock transfer member 24 can be improved.

As illustrated in FIGS. 2 to 6, the glove box structure for a vehicle includes the storage portion 21 and the lid portion 23. The storage portion 21 that stores items is disposed below the instrument panel 16. The lid portion 23 is openably mounted on the instrument panel 16 so as to cover the storage portion 21.

The honeycomb structure ribs 32, which are integrally formed with the inner panel 31 on the front surface 31a side of the inner panel 31, and the intermediate panel 33, which is attached to the honeycomb structure ribs 32 so as to increase the shock transfer capability of the inner panel 31, are disposed between the inner panel 31 and the outer panel 34 in the lid portion 23. This allows the lid portion 23 to have a sufficient shock transfer capability even without using, for example, the corrugated panel (load transfer portion) 126 that is formed of steel and transfers shock from the knees of the occupant. As a result, the weight of the vehicle body can be decreased compared to the case in which the steel corrugated panel (load transfer portion) 126 is used.

Figure 5:
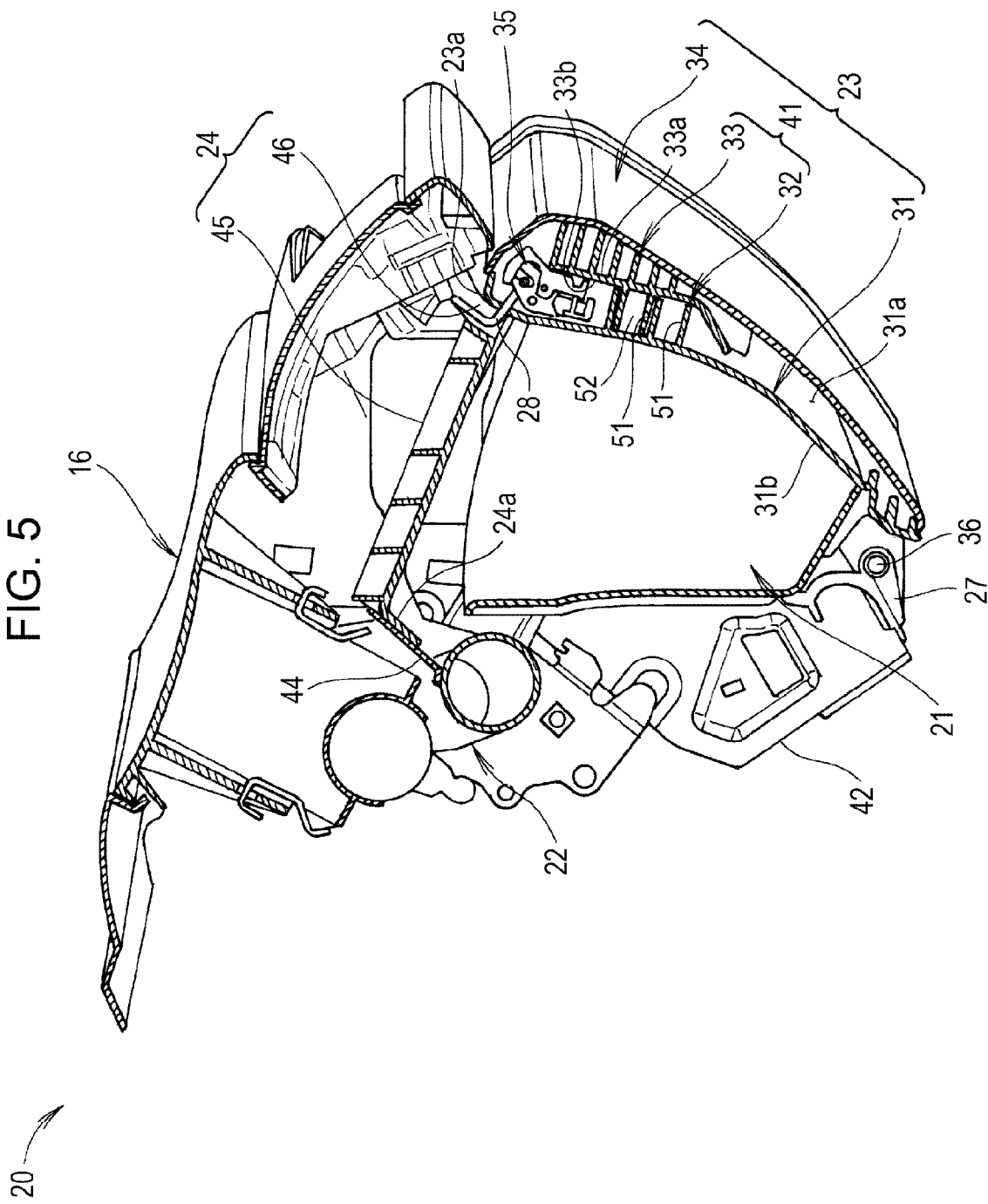
FIG. 5 is a sectional view of the glove box structure for a vehicle illustrated in FIG. 2 taken along line V-V in FIG. 2.

As illustrated in FIG. 5, in the glove box structure for a vehicle, the shock transfer member 24, which receives the upper end 23a of the lid portion 23 in the longitudinal direction of the vehicle, extends from the vehicle body structure 22. The shock transfer member 24 has a substantially T-like shape in plan view. The vertical portion 45, which corresponds to the vertical portion of the substantially T-like shape, has the end portion 24a that is supported by the vehicle body structure 22. The horizontal portion 46, which corresponds to the horizontal portion of the substantially T-like shape, receives the upper end 23a of the lid portion 23. Thus, a load transferred from the lid portion 23 can be uniformly received by the horizontal portion 46, and the load can be efficiently transferred to the vehicle body structure 22 using the vertical portion 45. For example, when the shape of a connection in which the vertical portion 45 and the horizontal portion 46 are connected to each other is formed to have a curved shape, a load can be more smoothly transferred from the lid portion 23 to the vehicle body structure 22. That is, efficiency with which a load from the lid portion 23 is transferred can be improved.

As illustrated in FIG. 5, in the glove box structure for a vehicle, the storage portion 21 is disposed on the rear surface 31b of the inner panel 31 and is a projectable storage portion that is projectable from a position below the instrument panel 16 together with the inner panel 31. Thus, there is no member that transfers shock to a portion behind the lid portion 23, and the lid portion 23 needs to have a shock transfer capability.

For this reason, the honeycomb structure ribs 32, which are integrally formed with the inner panel 31 on the front surface 31a side of the inner panel 31, and the intermediate panel 33, which is attached to the honeycomb structure ribs 32 so as to increase the shock transfer capability of the inner panel 31, are disposed between the inner panel 31 and the outer panel 34 in the lid portion 23. This allows the lid portion 23 to have a sufficient shock transfer capability.

In addition, the shock transfer member 24, which receives the upper end 23a of the lid portion 23 in the longitudinal direction of the vehicle, extends from the vehicle body structure 22. The shock transfer member 24 has a substantially T-like shape in plan view. The vertical portion 45 has the end portion 24a that is supported by the vehicle body structure 22. The horizontal portion 46 receives the upper end 23a of the lid portion 23. Thus, a load applied to the lid portion 23 can be transferred to the vehicle body structure 22.

That is, by giving the lid portion 23 a sufficient shock transfer capability and by transferring a load applied to the lid portion 23 to the vehicle body structure 22, even when the storage portion 21 is disposed on the rear surface 31b of the inner panel 31 and is a projectable storage portion that is projectable from a position below the instrument panel 16 together with the inner panel 31, the knees of the occupant can be sufficiently protected.

As illustrated in FIGS. 5 and 7 to 9, in the glove box structure for a vehicle, since the intermediate panel 33 is attached to the honeycomb structure ribs 32, the intermediate panel 33 and the honeycomb structure ribs 32 can each have improved yield strength. The substantially hexagonal intermediate panel cells 52, the number of which is smaller than that of the inner panel cells 51 formed in the honeycomb structure, are formed in the intermediate panel 33. In addition, the substantially hexagonal intermediate panel cells 52 are fitted into some of the inner panel cells 51. This allows a transferred load to be distributed.

As illustrated in FIG. 7, in the glove box structure for a vehicle, the inner panel cells 51 that are formed in the honeycomb structure have a plurality of substantially hexagonal shapes. Thus, the breaking force of the inner panel 31 can be partially varied. By doing this, strength of a portion in which stress is concentrated can be intentionally increased.

As illustrated in FIG. 15, in the glove box structure for a vehicle, the shock transfer member 24 is upwardly inclined toward the front side of the vehicle body so as to extend along a load transfer direction when the knees of the occupant contact the lid portion 23. Thus, efficiency with which a load from the knees of the occupant is transferred can be improved.

Figure 6:
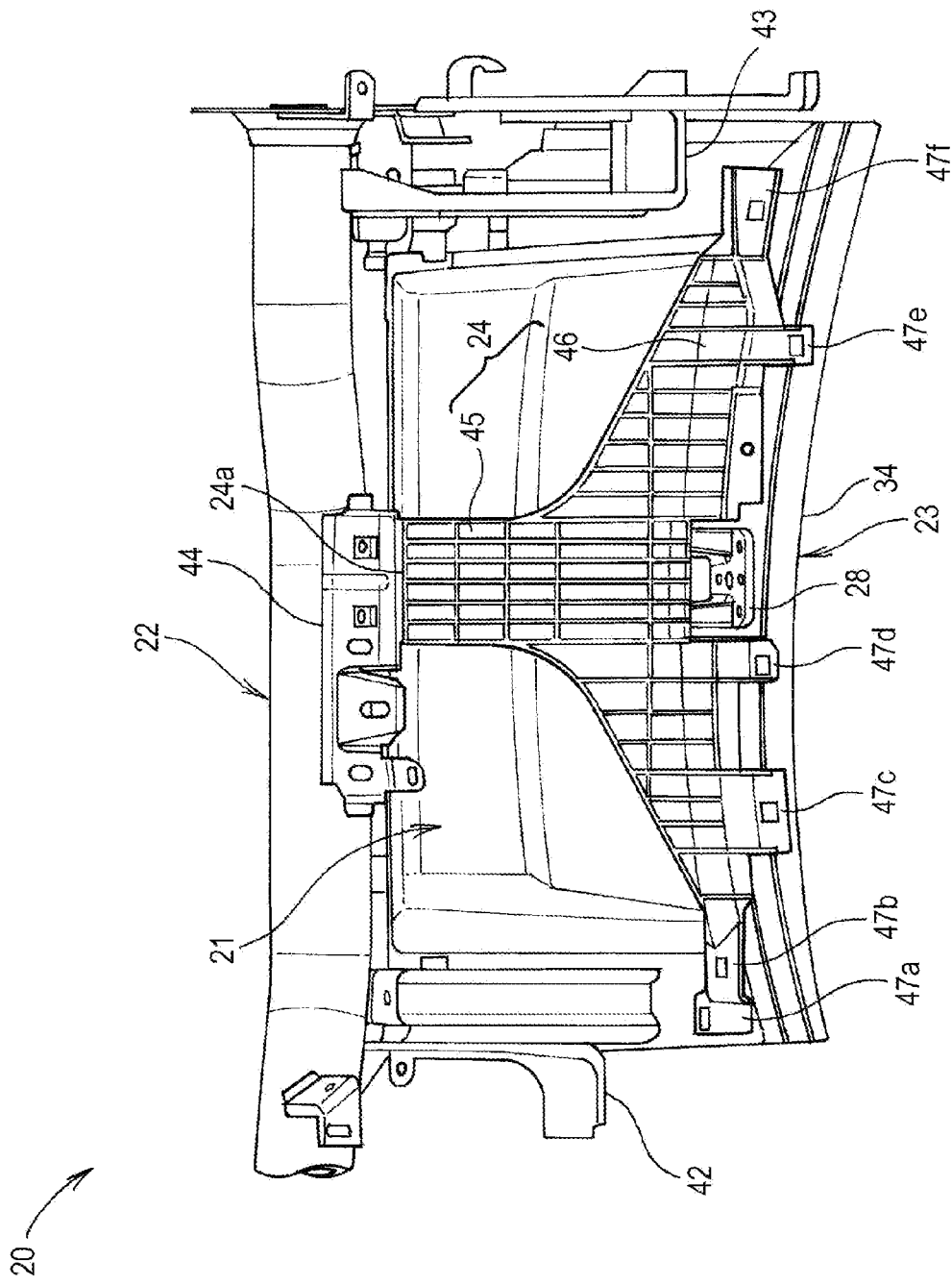
FIG. 6 is a plan view of the glove box structure for a vehicle illustrated in FIG. 2 with an instrument panel removed.

As illustrated in FIG. 6, in the glove box structure for a vehicle, the vehicle body structure 22 is a steering hanger that extends in the width direction of the vehicle and supports the steering wheel 17. The vehicle body structure 22 has a high stiffness, and accordingly, can reliably receive a load transferred from the shock transfer member 24.

The glove box structure for a vehicle according to the embodiment of the present invention includes, as illustrated in FIG. 5, the storage portion 21 that is integrally formed with the inner panel 31 on the rear surface 31b of the inner panel 31, and is a projectable storage portion that is projectable from a position below the instrument panel 16 together with the inner panel 31 (kangaroo pouch-like storage portion). However, the storage portion 21 is not limited to this. The storage portion 21 may be formed below the instrument panel 16, and only a lid may be openable.

The glove box structure for a vehicle according to the embodiment of the present invention has the integrated honeycomb structure ribs 32 formed on the front surface 31a side of the inner panel 31 as illustrated in FIG. 7. However, the honeycomb structure ribs 32 are not limited to this. The honeycomb structure ribs 32 may form vertically long cells, horizontally long cells, or regular hexagonal cells (or, triangular cells, circular cells, or elliptical cells), or may be formed into a grid-like structure.

The embodiment of the present invention is preferably applicable to an automobile having a glove box structure for a vehicle. The glove box structure for a vehicle includes a storage portion that is disposed below an instrument panel and stores items and a lid portion that is openably mounted to the instrument panel and covers the storage portion.

According to an embodiment of the present invention, a glove box structure for a vehicle includes a storage portion that is disposed below an instrument panel and stores items, and a lid portion that is openably mounted on the instrument panel and covers the storage portion. In the glove box structure for a vehicle, the lid portion includes an inner panel that is disposed on the storage portion side, honeycomb structure ribs that are integrally formed with the inner panel on a front surface side of the inner panel, an intermediate panel that is attached to the honeycomb structure ribs and increases a shock transfer capability of the inner panel, and an outer panel that is mounted on the inner panel. The intermediate panel is sandwiched between the outer panel and the honeycomb structure ribs.

Thus, the lid portion can have a sufficient shock transfer capability even without using, for example, a knee bolster (shock-absorbing portion) that is formed of a steel plate and transfers shock from the knees of the occupant. As a result, the weight of the vehicle body can be decreased compared to the case in which the knee bolster (shock-absorbing portion) formed of a steel plate is used.

According to an embodiment of the present invention, a glove box structure for a vehicle includes a storage portion that is disposed below an instrument panel and stores items, and a lid portion that is openably mounted on the instrument panel and covers the storage portion. In the glove box structure for a vehicle, a shock transfer member extends from a vehicle body structure. The shock transfer member receives an upper end of the lid portion in a longitudinal direction of a vehicle body. The shock transfer member has a substantially T-like shape in plan view. A vertical portion of the shock transfer member that corresponds to a vertical portion of the substantially T-like shape has an end portion that is supported by the vehicle body structure, and a horizontal portion of the shock transfer member that corresponds to a horizontal portion of the substantially T-like shape receives the upper end of the lid portion.

Thus, a load transferred from the lid portion can be uniformly received by the horizontal portion, and the load can be efficiently transferred to the vehicle body structure using the vertical portion. When the shape of a connection in which the vertical portion and the horizontal portion are connected to each other is formed to have, for example, a curved shape, a load can be more smoothly transferred from the lid portion to the vehicle body structure. That is, efficiency with which a load from the lid portion is transferred can be improved.

The storage portion may be disposed on a rear surface of the inner panel, and may be a projectable storage portion that is projectable from a position below the instrument panel together with the inner panel. In this case, there is no member that transfers shock to a portion behind the lid portion, and the lid portion needs to have a shock transfer capability.

For this reason, the honeycomb structure ribs, which are integrally formed with the inner panel on the front surface side of the inner panel, and the intermediate panel, which is attached to the honeycomb structure ribs so as to increase the shock transfer capability of the inner panel, are disposed between the inner panel and the outer panel in the lid portion. This allows the lid portion to have a sufficient shock transfer capability.

That is, by giving the lid portion a sufficient shock transfer capability, even when the storage portion is disposed on the rear surface of the inner panel and is a projectable storage portion that is projectable from a position below the instrument panel together with the inner panel, the knees of the occupant can be sufficiently protected.

The intermediate panel may be attached to the honeycomb structure ribs. Thus, the intermediate panel and honeycomb structure ribs can each have improved yield strength. In this case, the intermediate panel may have at least one substantially hexagonal intermediate panel cell formed thereon, and the honeycomb structure may have inner panel cells formed therein. The number of the at least one substantially hexagonal intermediate panel cell is smaller than the number of the inner panel cells, and the at least one substantially hexagonal intermediate panel cell is fitted into a corresponding one of the inner panel cells. Thus, a transferred load can be distributed.

The honeycomb structure may have inner panel cells formed therein that have substantially hexagonal shapes. In this case, the substantially hexagonal shapes include a plurality of variations thereof. Thus, the breaking force of the inner panel can be partially varied. By doing this, strength of a portion in which stress is concentrated can be intentionally increased.

The shock transfer member may be upwardly inclined toward a front side of the vehicle body so as to extend along a load transfer direction in which a load is transferred when the knees of the occupant contact the lid portion. Thus, efficiency with which a load from the knees of the occupant is transferred can be improved.

The vehicle body structure may be a steering hanger that extends in a width direction of the vehicle so as to support a steering wheel. The steering hanger has a high stiffness, and accordingly, can reliably receive a load transferred from the shock transfer member.

Obviously, numerous modifications and variations of the present invention are possible in light of the above teachings. It is therefore to be understood that within the scope of the appended claims, the invention may be practiced otherwise than as specifically described herein.

What is claimed is:

1. A glove box structure for a vehicle, comprising:
    a storage portion disposed below an instrument panel of the vehicle and configured to store an item; and
    a lid portion openably mounted on the instrument panel and attached to the storage portion, the lid portion comprising:
        an inner panel disposed on a storage portion side;
        honeycomb structure ribs integrally formed with the inner panel, each of the honeycomb structure ribs being disposed on a first surface of the inner panel, the first surface being disposed on an opposite side of the inner panel to the storage portion, the honeycomb structure ribs defining inner panel cells protruding from the first surface of the inner panel;
        an intermediate panel attached to at least one of the honeycomb structure ribs, the intermediate panel including at least one intermediate panel cell fitted in at least one of the inner panel cells; and
        an outer panel mounted on the inner panel, the intermediate panel being sandwiched between the outer panel and the honeycomb structure ribs,
        wherein the intermediate panel includes additional ribs provided on an opposite side of the intermediate panel with respect to the at least one intermediate panel cell.

2. A glove box structure for a vehicle, comprising:
    a storage portion disposed below an instrument panel of the vehicle and configured to store items;
    a lid portion openably mounted on the instrument panel and attached to the storage portion; and
    a shock transfer member extending from a vehicle body structure of the vehicle, the shock transfer member being configured to support an upper end of the lid portion in a longitudinal, the shock transfer member having a substantially T-like shape, the shock transfer member comprising:
        a first portion corresponding to a vertical portion of the substantially T-like shape and having an end portion supported by the vehicle body structure; and
        a second portion corresponding to a horizontal portion of the substantially T-like shape and configured to support the upper end of the lid portion, the second portion including a first end and a second end, the second end being opposite to the first end in a width direction of the vehicle, a length of the second portion in a longitudinal direction of the vehicle gradually increasing from the first end of the second portion towards the first portion in the width direction of the vehicle, the longitudinal direction extending between a front side and a rear side of the vehicle, wherein the second portion extends along the width direction of the vehicle and is attached to the instrument panel, wherein the first portion extends from the second portion to the vehicle body structure along the longitudinal direction of the vehicle, and wherein a length of the second portion in the longitudinal direction of the vehicle gradually increases from the second end of the second portion towards the first portion in the width direction of the vehicle.

3. The glove box structure for a vehicle according to claim 1, wherein the storage portion is disposed on an opposite side of the inner panel to the first surface, the storage portion being projectable from the instrument panel together with the inner panel.

4. The glove box structure for a vehicle according to claim 1, wherein the at least one intermediate panel cell has a substantially hexagonal shape, and wherein a number of the at least one intermediate panel cell is smaller than a number of the inner panel cells.

5. The glove box structure for a vehicle according to claim 1, wherein the inner panel cells have substantially hexagonal shapes including a plurality of variations.

6. The glove box structure for a vehicle according to claim 1, further comprising:

a shock transfer member extending from a vehicle body structure of the vehicle, the shock transfer member being configured to support an upper end of the lid portion, the shock transfer member having a substantially T-like shape, the shock transfer member comprising:

a first portion corresponding to a vertical portion of the substantially T-like shape and having an end portion supported by the vehicle body structure; and a second portion corresponding to a horizontal portion of the substantially T-like shape and configured to support the upper end of the lid portion.

7. The glove box structure for a vehicle according to claim 2, wherein the shock transfer member is upwardly inclined toward the vehicle body structure, the shock transfer member extending along a load transfer direction in which a load is transferred when a knee of an occupant contact the lid portion.

8. The glove box structure for a vehicle according to claim 2, wherein the vehicle body structure comprises a steering hanger extending in the width direction of the vehicle and supporting a steering wheel of the vehicle.

9. The glove box structure for a vehicle according to claim 2, wherein the first portion is provided at a substantially center of the second portion in the width direction of the vehicle.

10. The glove box structure for a vehicle according to claim 2, wherein a connection in which the first portion and the second portion are connected to each other has a curved shape.

11. The glove box structure for a vehicle according to claim 2, wherein the lid portion includes
an inner panel,
an outer panel mounted on the inner panel, and
a lock mechanism provided between the inner panel and the outer panel to be locked with the instrument panel.

12. The glove box structure for a vehicle according to claim 11, further comprising a striker provided to connect, when the striker is locked with the lock mechanism, the shock transfer member to the lock mechanism, wherein a position of the first portion of the shock transfer member in the width direction of the vehicle is substantially the same as a position of the striker in the width direction of the vehicle.

13. The glove box structure for a vehicle according to claim 12, wherein the second portion includes a recess provided on an opposite side of the first portion with respect to the second portion in the longitudinal direction of the vehicle, and wherein the striker is provided in the recess.

14. The glove box structure for a vehicle according to claim 6, wherein the second portion includes a first end and a second end, the second end being opposite to the first end in a width direction of the vehicle, and wherein a length of the second portion in a longitudinal direction of the vehicle gradually increases from the first end of the second portion towards the first portion in the width direction of the vehicle, the longitudinal direction extending between a front side and a rear side of the vehicle.

15. The glove box structure for a vehicle according to claim 14, wherein a length of the second portion in the longitudinal direction of the vehicle gradually increases from the second end of the second portion towards the first portion in the width direction of the vehicle.

16. The glove box structure for a vehicle according to claim 1, wherein the intermediate panel includes a plurality of intermediate panel cells fitted in the inner panel cells, and wherein the intermediate panel cells are spaced apart from each other on the intermediate panel.

17. The glove box structure for a vehicle according to claim 1, wherein the additional ribs are rectangular in shape.

* * * * *